Patented Mar. 26, 1940

2,194,704

UNITED STATES PATENT OFFICE 2,194,704

UNSATURATED KETONES AND PROCESS FOR PRODUCING THEM

John W. Kroeger, Philadelphia, Pa., assignor to E. I. du Pont de Nemours & Company, Wilmington, Del., a corporation of Delaware No Drawing. Application April 15, 1938, Serial No. 202,210

17 Claims. (Cl. 260—593)

This invention relates to the production of new derivatives of acetylenic compounds. More particularly, it relates to the production of unsaturated carbonyl compounds. Still more particularly it relates to a new reaction of acetylenic compounds with acyl halides.

The Friedel-Crafts reaction has long been known. It was at first carried out with aluminum chloride but more recently it has been shown that a similar reaction will take place in the presence of other somewhat similar catalysts which with aluminum chloride have come to be known as Friedel-Crafts type catalysts. The applications of the reaction have also been extended considerably from the original which involved condensing alkyl halides with aromatic hydrocarbons whereby to alkylate the hydrocarbon. Among the more recently discovered uses of the Friedel-Crafts type catalysts is as catalysts for the addition of acyl halides to olefinic compounds to produce chloro ketones which lose hydrogen chloride upon distillation. This is not a true Friedel-Crafts type reaction since it is an addition rather than a condensation but the product obtained on distillation is that which would be obtained if the process followed the Friedel-Crafts course.

It is an object of this invention to react acetylenic hydrocarbons with acyl halides. It is a further object of this invention to produce unsaturated halo ketones from acetylenic compounds and acyl halides. A more specific object is to produce chloro-olefinic ketones from acetylenic compounds by reacting the acetylenic compounds with acyl chlorides. Other objects will appear hereinafter.

It has now been found that in the presence of suitable catalysts, acetylenic compounds react with organic carboxylic acid halides to form addition products. Thus, acetylenic hydrocarbons react with acyl halides to form mainly halo-olefinic ketones together with smaller amounts of 2-halo-olefins and traces of organic esters. In most cases, the halogen vinyl ketones were isolated in good yields by well known methods of fractionation; in some cases, polymers were readily obtained. A preferred embodiment of the invention involves reacting a low molecular weight (about 10 carbon atoms or less) acetylenic compound of the general formula R—C≡C—R′, in which R is a low molecular weight hydrocarbon radical in which the open chain carbon atoms are saturated and R′ is hydrogen or a low molecular weight hydrocarbon radical in which the open chain carbon atoms are saturated, with a chloride of a low molecular weight (about 10 carbon atoms or less) saturated aliphatic carboxylic acid in the presence of one of the condensing agents mentioned hereinafter, and then separating the chloro-olefinic ketone so formed.

The principal reaction is

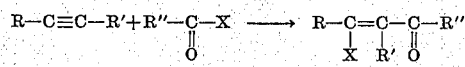

in which general formulae R is a hydrocarbon radical and R′ is hydrogen or a hydrocarbon radical and R″ is a hydrocarbon or substituted hydrocarbon radical. Thus, the acetylenic compound may be one in which R is hydrogen and R′ is hydrocarbon or both may be hydrocarbon. A satisfactory explanation for the formation of the chloro-olefins has not been advanced, but they correspond to the products which would be obtained by the addition of a molecule of HCl to the alkyl acetylene used in the process.

A further description of the process and products will be obtained from the following examples which are intended, however, to be construed as illustrative only and not as limiting the scope of the invention. In these examples, the parts are given by weight and the temperatures in degrees centigrade.

Example 1

A three-necked flask was equipped with a reflux condenser, dropping funnel and mercury-sealed stirrer. Into this was placed 850 parts of 1-hexyne and 820 parts of acetyl chloride, and while stirred vigorously, a solution of 40 parts of anhydrous stannic chloride in 100 parts of acetyl chloride was added dropwise. The addition was made at such a rate that the reaction mixture was heated to a slow reflux and held at this temperature until all of the catalyst had been added. The mixture was then refluxed by gentle heating for a period of one hour, then the unchanged hexyne and acetyl chloride were distilled off, and the residue was washed with water, then with 10% sodium carbonate and finally with water. The product was isolated from the remaining mixture by steam distillation, dried over calcium chloride and finally fractionated, giving 2-chloro-1-hexene, boiling at 107–111° C. and 4-chloro-3-octene-2-one, boiling at 75–95° C. at 20 mm. pressure. Further fractionation of the ketone fraction in a 35 cm. column gave separation of two isomers (a) a material boiling at 69° C. at 10 mm. pressure, believed to be the trans-isomer, semicarbazone, melting 109–110° C., and (b) a material boiling at 80° C. at 10 mm. believed to be the cis-isomer, semicarbazone melting at 121.0–121.5° C.

The technique employed in Example 1 was applied to equivalent amounts of the reactants in the case of other acetylenes and acyl chlorides and the following olefinic ketones and chloroolefins were produced:

| Compound | B. P. | $d_4^{25}$ |
|---|---|---|
| 4-chloro-3-ethyl-3-hexene-2-one (trans ?) | 89–91°/30 mm | 0.9993 |
| 4-chloro-3-ethyl-3-hexene-2-one (cis ?) | 97–99°/30 mm | 1.0029 |
| 4-chloro-3-n-propyl-3-heptene-2-one (trans ?) | 112–113°/28 mm | 0.9592 |
| 4-chloro-3-n-propyl-3-heptene-2-one (cis ?) | 117–118°/28 mm | 0.9680 |
| 4-chloro-3-n-butyl-3-octene-2-one | 140–146°/28 mm | 0.9459 |
| 4-chloro-3-n-amyl-3-nonene-2-one | 115–121°/5 mm | 0.9348 |
| 4-chloro-3-hexene-2-one | 46–53°/10 mm | 1.0073 |
| 4-chloro-3-heptene-2-one (trans ?) | 54.5–55.5°/10 mm | 1.0134 |
| 4-chloro-3-heptene-2-one (cis) | 62–63°/10 mm | 1.0321 |
| 4-chloro-3-octene-2-one (trans) | 69°/10 mm | 0.9705 |
| 4-chloro-3-octene-2-one (cis) | 80°/10 mm | 0.9984 |
| 4-chloro-3-nonene-2-one (trans) | 89°/10 mm | 0.9752 |
| 4-chloro-3-nonene-2-one (cis) | 99°/10 mm | 0.9830 |
| 3-chloro-3-hexene | 113.0–115.5°/748 mm | 0.8898 |
| 4-chloro-4-octene | 157.5–159.5°/750 mm | 0.8788 |
| 5-chloro-5-decene | 99–100°/28 mm | 0.8753 |
| 6-chloro-6-dodecene | 128–129°/28 mm | 0.8760 |
| 2-chloro-1-butene | 57–59°/748 mm | 0.8950 |
| 2-chlor-1-hexene | 109.5–110.5°/735 mm | 0.8872 |
| 2-chloro-1-heptene | 138–139°/748 mm | 0.8788 |

*Example 2*

Eighty-two parts of hexyne and an equivalent weight of benzoyl chloride were stirred for several hours at room temperature while 20 parts of stannic chloride was added. After reaction, this mixture was poured into water and collected in benzene; upon distillation of the benzene, the residue was high boiling phenyl chlorohexenyl ketone and by-products, from which the ketone could be obtained by high vacuum fractionation.

*Example 3*

A reaction flask was equipped with a motor stirrer and a liquid ammonia-cooled condenser. Ten parts zinc chloride, 320 parts acetyl chloride and 100 parts of monovinylacetylene were stirred for two hours, then 10 parts additional zinc chloride was added and the stirring continued for a short time. During this time, the temperature in the flask rose to 45° and then dropped to room temperature. The product which consisted of a small amount of oily material and a large amount of solid polymer was extracted with ether, then washed with water, sodium carbonate solution and then dried over calcium chloride. The ether and a small amount of material boiling below 150° were removed by distillation at atmospheric pressure. The remainder was distilled at 10 mm. and a fraction collected boiling at 60°–100° which partially crystallized upon standing, giving a product melting about 60°. This product was unstable in air. The polymer which was separated initially from the reaction mixture was an infusible black solid.

The reactions described herein are effected in the presence of a catalyst. Catalysts of the Friedel-Crafts type have given very good results. These catalysts are also known as "katenoid" compounds. While Friedel-Crafts type catalysts are members of the class known as "katenoid" catalysts, the latter class covers a broader range of materials. The term "katenoid" catalyst is well known in the art. See, for example, the book of Robert Robinson, Versuch Einer Elektronentheorie Organisch-Chemischer Reaktionen, Verlag Ferdinand Enke, Stuttgart 1932, see especially page 16. See also U. S. Patents 2,008,032 and 2,029,539. The reactions described herein are, in general, more correctly defined as addition reactions but using "condensation" in its broader sense, they may also be called condensations.

The Friedel-Crafts type catalysts suitable for the purposes of this reaction include zinc chloride, zinc bromide, aluminum chloride, aluminum bromide, aluminum iodide, antimony pentachloride, phosphorus tri- and pentachlorides, phosphorus oxychloride, mercuric chloride, boron fluoride, stannic chloride, stannic bromide, ferric chloride, ferric bromide, bismuth chloride, cuprous bromide, and cuprous chloride. By keeping the quantity of catalyst low, the production of tarry polymers is minimized; in general, 2 to 4% of catalyst based upon the total weight of reactants has been found to be satisfactory but 25% or more of catalyst may be used, if desired. It is to be understood, therefore, that the invention is not limited to these particular concentrations of catalyst but instead includes within its scope the use of smaller amounts of catalyst as well as much larger amounts. Some catalysts, such as boron fluoride, phosphorus halides, etc., were found to be particularly vigorous polymerization agents, and in some cases, the selection of the catalyst best suited for the particular reaction influenced the yield. In the case of very reactive acetylenic compounds, such as, for example, monovinylacetylene, chemically active catalysts such as antimony pentachloride are not desirable. The halide in the catalyst need not be the same as the halide in the acyl halide and, in fact, mixed halides may be used as catalysts although where large amounts of catalyst are employed the presence of more than one halide would result in the formation of mixed halides.

The acetylenic compounds which may be reacted by the process disclosed herein include those comprehended by the formula

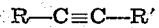

$$R\mathrm{-}C\mathrm{\equiv}C\mathrm{-}R'$$

in which R is a hydrocarbon group and R' is hydrogen or a hydrocarbon group, including acyclic, alicyclic, and aromatic. Thus, suitable acetylenic compounds include not only those in which R is hydrogen and R' is hydrocarbon but also those in which R and R' are both hydrocarbon. For example, the following may be named: 1-hexyne, 3-hexyne, 4-octyne, 5-decyne, 1-butyne, 1-pentyne, phenyl acetylene, diphenyl acetylene, monovinylacetylene, and divinylacetylene. In the case of the aryl acetylenes, however, there is greater possibility of by-products being formed thru ring substitution as a result of modified Friedel-Crafts reaction.

It has been found that the reaction may be carried out in the presence of an inert solvent if that is desirable, and in so doing, though the reaction is slower, polymerization is decreased to some extent. Aliphatic hydrocarbon solvents with a boiling range which will not interfere with the separation of products are particularly well suited for this purpose, for example, petroleum ether. The catalysts may be added directly to the reaction mixture or they may be first dissolved in one of the reactants or in the inert solvent, if one is used, and then added in that form.

The temperature range for the reaction is not critical. Rapid reaction is favored with an increase in temperature, but at the same time, the formation of by-products is also increased with increase in temperature. It has frequently been found convenient to mix the reactants at room temperature and add the catalyst to the mixture at such a rate that the mixture is held at a gentle reflux, e. g., 70°-75°; although it is contemplated that the components of the reaction mixture may be brought together in other ways. In other applications of the process the mixture was stirred at room temperature or as low as −33° for a longer period of time and similar products were obtained. The use of pressure, particularly in the case of the volatile acetylenic compounds may be advantageous, since it increases the rate of reaction of the latter compounds. Pressure also increases the formation of by-product polymers, however.

As illustrated in Example 1, the reaction mixture may be gently heated after all the reactants have been added to assist in carrying the reaction to completion. Generally, the reactants are brought together in about equimolecular proportions but other proportions may be used, if desired, as in Example 1, where a considerable excess of acyl halide is added. In this latter example, the initial reaction mixture contains the reactants in equivalent proportions and the excess of acyl halide is added because it has been found to serve advantageously as a solvent for the catalyst. An excess of either reactant might be used to hasten the reaction but would necessitate recovery for the sake of economy.

The organic carboxylic acid halides which may be reacted with acetylenic compounds according to this process include both aromatic carboxylic acid halides and aliphatic carboxylic acid halides, particularly the chlorides of such acids as acetic, propionic, butyric, valeric, isovaleric, b-chloropropionic, benzoic, stearic, etc. It may be noted, however, that in the case of aromatic carboxylic acid halides and other substituted carboxylic acid halides there is a possibility in some cases of the formation of substantial amounts of by-products and accordingly the unsubstituted saturated aliphatic carboxylic acid halides, particularly the chlorides and the bromides and particularly those of low molecular weight (about 10 carbon atoms or less) are preferred. It has also been found that in addition to the above other acid halides may be used, such as benzene sulfonyl chloride.

The products of this reaction may be isolated in any desired manner. One method which has proven satisfactory is described in Example 1. Both the methods of carrying out the reaction and the method of isolating the products may be varied from those particularly described herein.

The chloro-olefinic ketones produced in the course of this reaction are pleasant-smelling liquids and are colorless to light yellow in color when freshly distilled, but darken slightly upon standing. They possess a slight vesicant and lachrymatory action which decreases with increase in molecular weight of the compound. They were found to oxidize to some extent by air, especially the lower members of the series. (In the case of the lowest member of the group tested, 4-chloro-3-hexene-2-one, a temperature of 75° was reached by the exothermic oxidation resulting from bubbling air through the pure substance.) They decompose in the presence of acids, but keep indefinitely, by the addition of a small amount of slightly alkaline material such as an alkali metal carbonate, for example, lithium, sodium or potassium carbonate. The invention is not limited to the use of these particular materials, however. Instead, the use of acid accepters generally to prevent decomposition of the chloro-olefinic ketones is within the scope of the invention. Thus, alkaline earth carbonates or hydroxides may be used.

The cis and trans isomers of the chloro-olefinic ketones were frequently separable and were isolated in certain cases. On standing for a few weeks, the pure isomers revert to an equilibrium mixture.

The products prepared in the course of this reaction find application as raw materials and intermediates for the preparation of rubber substitutes, dyes, resins and chemicals for the textile and rubber industries.

The unsaturated halo ketones produced by the process of this invention are new compositions of matter not previously known. The chloro derivatives particularly appear to have considerable potential value. Compounds prepared from acetylenes having the triple bond in the 1-position give promise, in general, of being somewhat cheaper to produce and equally as useful if not more useful than the other compounds which may be obtained. As stated above, compounds from acetylenes of 10 carbon atoms or less, which contain no other unsaturation than the acetylenic bond, are a preferred group. The latter also give promise of greater practical utility than the class as a whole.

It is apparent that many widely different embodiments of this invention may be made without departing from the spirit and scope thereof and therefore it is not intended to be limited except as indicated in the following claims.

I claim:

1. Compounds of the general formula

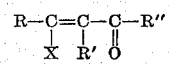

in which R is a hydrocarbon radical, R' is a member of the group consisting of hydrogen and hydrocarbon radicals, and R'' is a hydrocarbon radical, and X is a halogen.

2. Compounds as described in claim 1, further characterized in that X is chlorine.

3. Compounds as described in claim 1, further characterized in that R is a hydrocarbon radical in which the open chain carbon atoms are saturated, R' is a member of the group consisting of hydrogen and hydrocarbon radicals in which the open chain carbon atoms are saturated, and R'' is a saturated aliphatic hydrocarbon radical.

4. Compounds as described in claim 1, further characterized in that R is a hydrocarbon radical in which the open chain carbon atoms are saturated, R' is a member of the group consisting of hydrogen and hydrocarbon radicals in which the open chain carbon atoms are saturated, R'' is a saturated aliphatic hydrocarbon radical, and X is chlorine.

5. Compounds as described in claim 1, further characterized in that the chain

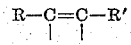

in the formula contains less than eleven carbon atoms, and in that R is a low molecular weight hydrocarbon radical in which the open chain carbon atoms are saturated, R' is a member of the group consisting of hydrogen and low molecular weight hydrocarbon radicals in which the open chain carbon atoms are saturated, R'' is a low molecular weight saturated aliphatic hydrocarbon radical, and X is chlorine.

6. The process which comprises forming an addition product of an organic carboxylic acid halide and a compound of the general formula R—C≡C—R', in which R is a hydrocarbon radical and R' is a member of the group consisting of hydrogen and hydrocarbon radicals.

7. The process which comprises reacting an organic carboxylic acid halide with a compound of the general formula R—C≡C—R', in which R is a hydrocarbon radical and R' is a member of the group consisting of hydrogen and hydrocarbon radicals, in the presence of a condensation catalyst.

8. The process of claim 7, further characterized in that the catalyst is a katenoid compound.

9. The process which comprises reacting an organic carboxylic acid halide with a compound of the general formula R—C≡C—R', in which R is a hydrocarbon radical and R' is a member of the group consisting of hydrogen and hydrocarbon radicals, in the presence of a Friedel-Crafts type catalyst.

10. The process which comprises reacting a carboxylic acid halide of the general formula

in which R is a saturated aliphatic hydrocarbon radical and X is a halogen, with an acetylenic compound of the general formula R'—C≡C—R'', in which R' is a hydrocarbon radical and R'' is a member of the group consisting of hydrogen and hydrocarbon radicals, in the presence of a Friedel-Crafts type catalyst.

11. The process which comprises reacting a carboxylic acid halide of the general formula

in which R is a saturated aliphatic hydrocarbon radical, with an acetylenic compound of the general formula R'—C≡C—R'', in which R' is a hydrocarbon radical and R'' is a member of the group consisting of hydrogen and hydrocarbon radicals, in the presence of a katenoid compound as a catalyst.

12. The process which comprises reacting a carboxylic acid halide of the general formula

in which R is a saturated aliphatic hydrocarbon radical, with an acetylenic compound of the general formula R'—C≡C—R'', in which R' is a hydrocarbon radical and R'' is a member of the group consisting of hydrogen and hydrocarbon radicals, in the presence of a Friedel-Crafts type catalyst.

13. The process which comprises reacting a carboxylic acid halide of the general formula

in which R is a saturated aliphatic hydrocarbon radical, with an acetylenic compound of the general formula R'—C≡C—R'', in which R' is a hydrocarbon radical in which the open chain carbon atoms are saturated and R'' is a member of the group consisting of hydrogen and hydrocarbon radicals in which the open chain carbon atoms are saturated, in the presence of a Friedel-Crafts type catalyst.

14. The process which comprises reacting a carboxylic acid halide of the general formula

in which R is a low molecular weight saturated aliphatic hydrocarbon radical, with an acetylenic compound containing less than eleven carbon atoms and having the general formula R'—C≡C—R'', in which R' is a low molecular weight hydrocarbon radical in which the open chain carbon atoms are saturated and R'' is a member of the group consisting of hydrogen and low molecular weight hydrocarbon radicals in which the open chain carbon atoms are saturated, in the presence of a Friedel-Crafts type catalyst.

15. The process of claim 12, further characterized in that the reactants are mixed in the absence of the catalyst which is then added at such a rate that the reaction mixture is just heated to a slow reflux.

16. The process which comprises reacting a carboxylic acid halide of the general formula

in which R is a saturated hydrocarbon radical, with an acetylenic compound of the general formula R'—C≡C—R'', in which R' is a hydrocarbon radical and R'' is a member of the group consisting of hydrogen and hydrocarbon radicals, in the presence of a Friedel-Crafts type catalyst, and then separating from the reaction mixture a chloro-olefinic ketone.

17. The process for preparing 4-chloro-3-octene-2-one which comprises bringing together 1-hexyne and acetyl chloride and then while agitating adding about 2½%, based on the weight of reactants, of stannic chloride dissolved in acetyl chloride, at such a rate that the reaction mixture is just heated to a slow reflux until all the stannic chloride is added and then heating gently to complete the reaction and thereafter separating 4-chloro-3-octene-2-one from the reaction mixture.

JOHN W. KROEGER.